United States Patent
Coleman et al.

[15] 3,670,078
[45] June 13, 1972

[54] CONTROL OF HOOKWORM LARVAE EMPLOYING A MIXTURE OF CERTAIN PHOSPHATE ESTERS

[72] Inventors: William R. Coleman; Thomas E. Duffey, both of Miami, Fla.

[73] Assignee: Pet Chemicals, Inc., Miami Springs, Fla.

[22] Filed: Feb. 24, 1970

[21] Appl. No.: 13,798

[52] U.S. Cl. ............................................. 424/212, 424/219
[51] Int. Cl. ................................................. A01n 9/36
[58] Field of Search .................. 424/212, 219; 260/941, 957

[56] References Cited

UNITED STATES PATENTS

| | | | |
|---|---|---|---|
| 2,956,073 | 10/1960 | Whetstone et al. | 424/219 |
| 2,982,686 | 5/1961 | Whetstone et al. | 424/212 |
| 3,366,715 | 1/1968 | Morales | 424/212 |

*Primary Examiner*—Albert T. Meyers
*Assistant Examiner*—Vincent D. Turner
*Attorney*—Fidelman, Wolffe & Leitner

[57] ABSTRACT

Effective control of hookworm larvae in kennels, dog runs, yards, and like areas habited by hookworm susceptible domestic animals is provided by contacting the area with a composition comprising an aqueous medium containing pesticidal amounts of a first compound having the formula:

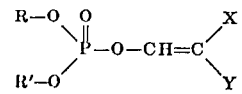

and a second compound having the formula:

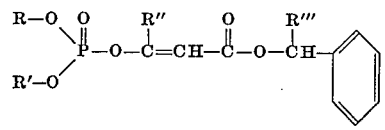

where in the formulae, R and R' are lower alkyl having one to five carbon atoms, R'' and R''' are hydrogen or lower alkyl having one to five carbon atoms, X is halogen, preferably chlorine, and Y is hydrogen or halogen, preferably chlorine.

5 Claims, No Drawings

CONTROL OF HOOKWORM LARVAE EMPLOYING A MIXTURE OF CERTAIN PHOSPHATE ESTERS

Parasitical infestations in dogs and cats by nematodes of the hookworm species occur widely throughout the United States and many other areas of the world. There are four species of hookworm found in the United States. *Ancylostoma caninum* is widely distributed and is the most commonly occurring form throughout the country. *A. braziliense* occurs primarily in the subtropical environments of the southern states. *Uncinaria stenocephala is found primarily in northern areas, and is more commonly associated with the fox than with domestic dogs and cats. A fourth species, Ancylostoma tubaeforme*, has been reported only in cats in New Jersey.

The life cycle of the hookworm is comparatively simple, and is basically similar for all the species. Adult females produce many eggs which are eliminated in the fecal matter of the host. In moist, warm conditions, the eggs complete development and hatch in 48 to 72 hours. Within about another week, the infective stage will be reached.

Infective larvae are capable of penetrating the skin of a potential host, e.g., a dog or cat, when they come into contact with the skin, but most infections are acquired by ingestion of the larvae with infested food and water by the host. Regardless of how larvae gain entrance to the body of the host, they find their way into the blood stream and are carried to the lungs where they pass from the blood to the alveoli, migrate up the trachea, and return to the alimentary track. They attach to the mucosa of the second quarter of the small intestine where they mature and remain. The process of migration and maturation requires about three weeks. The worms ordinarily live about six months, but some may live for a year or even more. The mature females of hookworm are about fifteen millimeters long; the males at maturity are ordinarily about 12 millimeters in length.

The pathological changes of the host are primarily those associated with blood loss. A microcytic anemia is characteristic of hookworm infestation. In heavy infections, the movement of the worms from place to place during the life cycle may leave bleeding lesions. During the miagratory stage, there can be considerable hemorrhage in the lungs, which in heavy infections may ultimately simulate lobar pneumonia. During the period of maturity of the parasite, bleeding lesions often also develop in the intestine.

A few hundred worms in a mature host will produce no demonstrable symptoms, but 200 to 500 may kill a small puppy, and larger numbers will seriously debilitate or kill even the largest and healthiest of dogs. A heavily infected host will appear listless, unhealthy, and will develop anemia. In severe infestations, much blood can be lost into the digestive tract, to the extent of producing black tarry stools. Coughing and labored breathing often develop during the period of larvae migration through the lungs in massive infections. Prenatal infection appears to be possible, since puppies sometimes suffer from hookworm anemia without apparent exposure and even before the worms reach egg-laying maturity.

Effective treatments for hookworm infestation are known. The best is the administration of tetrachloroethylene, often with a purgative, also preferably followed by a saline cathartic, e.g., Epsom salt or Glauber's salt, 2 to 3 hours after the tetrachloroethylene is administered. Toluene, n-butyl chloride, and diethylcarbamazine have also been used, but do not have the full effectiveness of tetrachloroethylene. Such treatments must be administered with care in extremely young, weak, or debilitated dogs. An important consideration in the treatment of a hookworm infested animal is the nutritional status. A balanced diet, particularly including adequate amounts of protein, is particularly important in maintaining resistance to hookworm infestation. Once hookworms have caused anemia, use of minerals, vitamins, and blood transfusions can be indicated.

Since a few worms are of little consequence, and since treatment in extreme infestations can be dangerous, prevention of mass exposure to infection is of extreme importance, particularly for young puppies. Mass exposure results when large numbers of dogs are crowded together under unsanitary conditions, such as in kennels or runs. A common source of trouble is the crowding of puppies together in areas previously infested by other dogs. Prophylactic preparations are available for treating soil and other surfaces to destroy larvae, but are not notably more effective than the maintenance of clean and sanitary conditions, with the removal of fecal matter and repeated usage of hot water. Still other compositions which have been utilized for the prophylactic control of hookworms in soil or on other surfaces have proved to be toxic or irritating to dogs or other animals, or have resulted in damage to grass and/or ornamental plants.

There is, accordingly, a great need for means for prevention of the hookworm infection of dogs, cats, and other susceptible domesticated animals. It is an object of the present invention to provide a prophylactic composition for the elimination of hookworms, in whatever stage of development, from soil, sod, grass, fecal material, concrete surfaces, and the like, and to eliminate or substantially reduce exposure to hookworms, in whatever stage of development, of dogs, cats, and other susceptible domesticated animals. A further object is the provision of such a prophylactic composition which is not persistantly toxic or irritating to such animals or to humans, and which does not detrimentally affect grass or ornamental plants, or the like. A still further object is to provide such a prophylactic composition which will eliminate and/or control hookworm infestation of soil, concrete surfaces, and the like, for a useful period of time, but which is not a persistant environmental pollutant of water runoff of such areas and the like. Yet another object of the present invention is the provision for the method of the prophylactic control of hookworms.

The foregoing objects are all realized by the composition and method of the present invention, whereby areas infested with, or are likely to become infested with, hookworms are treated with an aqueous dispersion of a combination of two active ingredients represented by the following formulas

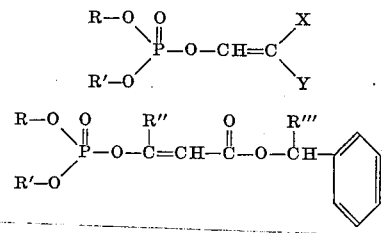

wherein R and R' are lower alkyl having one to five carbon atoms, X is halogen, preferably chlorine, Y is hydrogen or halogen, preferably hydrogen or chlorine, and R'' and R''' are hydrogen or lower alkyl having one to five carbon atoms.

A preferred combination comprises an aqueous dispersion of dimethyl-2,2-dichlorovinyl phosphate, commonly known as DDVP, and the dimethyl phosphate ester of α-methylbenzyl-3-hydroxy-cis-crotonate. The foregoing active components are provided in an aqueous medium in a pesticidal amount, e.g., an amount effective to as to act against the various stages of development of the hookworm eggs, larvae, and/or other stages of development. It is convenient to provide the active ingredients in an aqueous medium, with or without other related materials, in such a concentration that a convenient spraying or sprinkling of an aqueous medium upon the area to be treated provides a pesticidal amount of the active ingredients. For such applications, it will often be convenient to provide the active ingredients in a concentration on the order of about 100 to 10,000 parts each per million based on the total amount of the aqueous medium. The active ingredients can be dissolved in the aqueous medium, or may be absorbed or adsorbed upon a solid inert diluent or carrier which is, in turn, included in the aqueous medium in the form of a colloidal dispersion, emulsion, or suspension. Inert carriers which can be used include, for example, carbon black, silica, diatomaceous earth, and the like. It is preferred to provide the active ingredients, with or without an inert diluent or carrier, as a concentrate in a limited proportion of the contemplated aqueous medium, such as, for example, up to much as 10 to 15 per cent active ingredients, preferably about 8 to 10 per cent active ingredients, based on the total weight of the concentrate. The concentrate can then be combined with the balance of the appropriate aqueous medium, e.g., water, to dilute the concentrate to the appropriate level for application.

Since the aqueous spray will not penetrate fecal matter, it is important that all stool residues on soil or grass be removed or broken into small particles utilizing a strong stream of water or a mechanical implement before spraying.

To help prevent reinfestation, animals should be wormed at the time of application of the spray to areas frequented by the animals. It is preferable to use an anthelmintic other than one which may inhibit cholinesterase activity.

For best results, the spray should be repeated about 14 days after the first application.

The relative proportions of the two active ingredients are not narrowly significant, so long as each is provided in a pesticidal amount. It is preferred that the two be included in substantially equivalent weight proportions. Application of a pesticidal amount of each of the active ingredients, in an appropriate volume of an aqueous medium, results in destruction of the larvae of the hookworm. The treatment results in no damage to grass or other ornamental plants, and so long as not contacted directly with the spray, the composition is not harmful to humans or animals.

The particular combination of active ingredients, when applied to areas infested with hookworm larvae, cooperate, in a fashion not completely understood, to eliminate existing larvae and effectively control reinfestation for substantial periods of time, e.g., 6 to 8 months, or even longer. The cooperation of the active ingredients results in a substantially better result than can be attained by the use of either component alone, whatever amount is applied to the area to be treated.

EXAMPLE 1

The fenced-in exercise area of a veterinary hospital, measuring 6,000 square feet in area, consisting of grassy areas, bare sandy soil, some heavy grass, and Florida holly bushes, about 6 feet in height with numerous exposed roots and low branches extending from the base was utilized for a test of the composition and method of the present invention.

Eight soil samples of about one-half cupful each were taken at various points in the run under or near deposits of fecal material. These were centrifuged and microscopically examined under low-powered magnification, and revealed a substantial level of hookworm larvae infestation.

A composition in accordance with the present invention was prepared by mixing a concentrate containing 3.83 weight per cent of the dimethyl phosphate ester of $\alpha$-methylbenzyl-3-hydroxy-cis-crotonate and 4.18 per cent by weight of dimethyl-2,2-dichlorovinyl phosphate, dissolved in water. One quart of the concentrate was diluted with 100 gallons of water which was then applied to the area to be treated utilizing a power sprayer with a pressure of about 100 psi, with the nozzle adjusted to give a wet spray. The spray was relatively evenly distributed over the entire area, with some extra concentration of the spray in the vicinity of the heavy grass and woody vegetation. Dogs were kept out of the run for 14 days at which time the same application was repeated. One day after the second treatment, soil samples were taken from the same spots as the original samples, and were examined by the same technique of centrifigation and microscopic examination. The examination revealed the absence of hookwork larvae.

On the day following the second treatment, after the samples were taken for examination, the six dogs were placed in the run after being wormed two days earlier using tetrachloroethylene and maintained in isolation from possible exposure to hookworms thereafter. These dogs were kept in the treated area for a period of six months, at which time additional samples were taken from the area, which showed the level of infestation to be only 20 per cent of the original sample before treatment.

What is claimed is

1. A method of combating hookworm larvae which comprises applying thereto a larvicidally effective amount of a mixture of a first compound consisting of dimethyl-2,2-dichlorovinyl phosphate and a second compound consisting of the dimethyl phosphate ester of $\alpha$-methylbenzyl-3-hydroxy-cis-crotonate in an aqueous medium.

2. The method of claim 1 wherein said first and second compounds are present in substantially equal proportions by weight.

3. The method of claim 1 wherein said first and second compounds are each present in an amount of about 100 to 10,000 parts per million parts of the aqueous medium.

4. The method of claim 1 wherein said aqueous medium is water.

5. The method of claim 1 wherein said first and second compounds are dissolved in said aqueous medium.

* * * * *